United States Patent
Pei et al.

(10) Patent No.: US 10,908,976 B2
(45) Date of Patent: Feb. 2, 2021

(54) BROADCAST QUEUE ADJUSTMENT METHOD, TERMINAL, AND STORAGE MEDIUM

(71) Applicant: Guangdong OPPO Mobile Telecommunications Corp., Ltd., Guangdong (CN)

(72) Inventors: Runsheng Pei, Guangdong (CN); Liangjing Fu, Guangdong (CN); Ruyu Wu, Guangdong (CN); Zhiyong Lin, Guangdong (CN); Jun Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/565,423

(22) Filed: Sep. 9, 2019

(65) Prior Publication Data

US 2020/0004613 A1    Jan. 2, 2020

Related U.S. Application Data

(63) Continuation of application No. PCT/CN2018/078627, filed on Mar. 9, 2018.

(30) Foreign Application Priority Data

Mar. 10, 2017  (CN) .......................... 2017 1 0140902

(51) Int. Cl.
*G06F 3/00*    (2006.01)
*G06F 9/54*    (2006.01)

(52) U.S. Cl.
CPC .............. *G06F 9/546* (2013.01); *G06F 9/542* (2013.01); *G06F 2209/548* (2013.01)

(58) Field of Classification Search
CPC ................................. G06F 9/546; G06F 9/542
(Continued)

(56) References Cited

U.S. PATENT DOCUMENTS 9,344,391 B2 *   5/2016  Paramasivam ......... H04L 51/34
9,436,532 B1     9/2016  Chandrasekaran et al.
(Continued)

FOREIGN PATENT DOCUMENTS

CN    101174225 A    5/2008
CN    101448018 A    6/2009
(Continued)

OTHER PUBLICATIONS

WenxinXu, A Distributed Queueing Random Access Protocol For a Broadcast Channel. (Year: 1993).*
(Continued)

*Primary Examiner* — Lechi Truong

(57) ABSTRACT

A method for broadcast queue adjustment, a terminal, and a computer readable storage medium are provided. The method includes: acquiring a first broadcast queue corresponding to a broadcast message sending instruction after the broadcast message sending instruction is monitored; sequentially traversing each broadcast message to be sent in the first broadcast queue to determine a sending process of each broadcast message to be sent; and removing a broadcast message with a different sending process from the first broadcast queue, and creating a second broadcast queue according to the different sending process.

17 Claims, 4 Drawing Sheets

(58) Field of Classification Search
USPC .................................................. 719/314, 313
See application file for complete search history.

(56) References Cited

U.S. PATENT DOCUMENTS

| | | | |
|---|---|---|---|
| 10,251,194 B2* | 4/2019 | Dragomir | G06F 13/14 |
| 10,310,919 B2* | 6/2019 | Jin | H04L 67/2814 |
| 2004/0107240 A1* | 6/2004 | Zabarski | G06F 9/546 |
| | | | 709/201 |
| 2014/0086059 A1* | 3/2014 | Jiang | H04L 12/433 |
| | | | 370/236 |
| 2017/0045866 A1* | 2/2017 | Hou | H04L 12/2825 |
| 2017/0289639 A1* | 10/2017 | Reisner | H04N 21/812 |
| 2020/0004612 A1* | 1/2020 | Pei | G06F 9/542 |

FOREIGN PATENT DOCUMENTS

| | | |
|---|---|---|
| CN | 103051521 A | 4/2013 |
| CN | 103561421 A | 2/2014 |
| CN | 103595547 A | 2/2014 |
| CN | 105204949 A | 12/2015 |
| CN | 105897438 A | 8/2016 |
| CN | 106339435 A | 1/2017 |
| CN | 106874131 A | 6/2017 |
| WO | 2014189737 A2 | 11/2014 |

OTHER PUBLICATIONS

International search report for PCT/CN2018/078627, dated Apr. 28, 2018 (2 pages).
English translation of First Office Action in a counterpart Chinese Patent application No. 201710140902.9, dated May 5, 2019.
European search report, EP18763662, dated Jul. 1, 2020 (10 pages).

* cited by examiner

BROADCAST QUEUE ADJUSTMENT METHOD, TERMINAL, AND STORAGE MEDIUM

CROSS-REFERENCE TO RELATED APPLICATION(S)

The present application is a continuation of International Patent Application No. PCT/CN2018/078627, filed on Mar. 9, 2018, which claims foreign priority to Chinese Patent Application No. 201710140902.9, filed on Mar. 10, 2017, the entire contents of both of which are hereby incorporated by reference in their entireties.

TECHNICAL FIELD

The present disclosure relates to computer technology, particularly to a broadcast queue adjustment method, a broadcast queue adjustment device, a terminal, and a computer readable storage medium.

BACKGROUND

Broadcast is a widely used mechanism for transmitting information between applications. Taking an Android operating system as an example, it realizes data transmitting and sharing between applications through broadcast. Typically, broadcasts are Android's short message, telephone call, etc.

In an Android system, a broadcast sender sends a broadcast message by calling a sendBroadcast function, and a broadcast receiver registers the broadcast receiver in a management module by calling a registerReceiver function and defines broadcast messages of interest to itself, thus realizing the reception of the corresponding broadcast message.

In related art, the broadcast processing mechanism has defects, causing low broadcast processing efficiency, too much system resource consumption and poor stability.

SUMMARY

In a first aspect, the present disclosure provides a broadcast queue adjustment method including: acquiring a first broadcast queue corresponding to a broadcast message sending instruction after the broadcast message sending instruction is monitored; sequentially traversing each broadcast message to be sent in the first broadcast queue to determine a sending process of each broadcast message to be sent; and removing a broadcast message with a different sending process from the first broadcast queue, and creating a second broadcast queue according to the different sending process.

In a second aspect, the present disclosure provides a terminal including: a processor, a non-transitory memory, and a computer program stored in the non-transitory memory and executable on the processor, wherein the processor performs the following operations when executing the computer program: acquiring a first broadcast queue corresponding to a broadcast message sending instruction after the broadcast message sending instruction is monitored; sequentially traversing each broadcast message to be sent in the first broadcast queue to determine a sending process of each broadcast message to be sent; removing a broadcast message with a different sending process from the first broadcast queue, and creating a second broadcast queue according to the different sending process.

In a third aspect, the present disclosure provides a non-transitory computer readable storage medium storing computer executable instructions for performing the above broadcast queue adjustment method.

DETAILED DESCRIPTION

Figure 1:
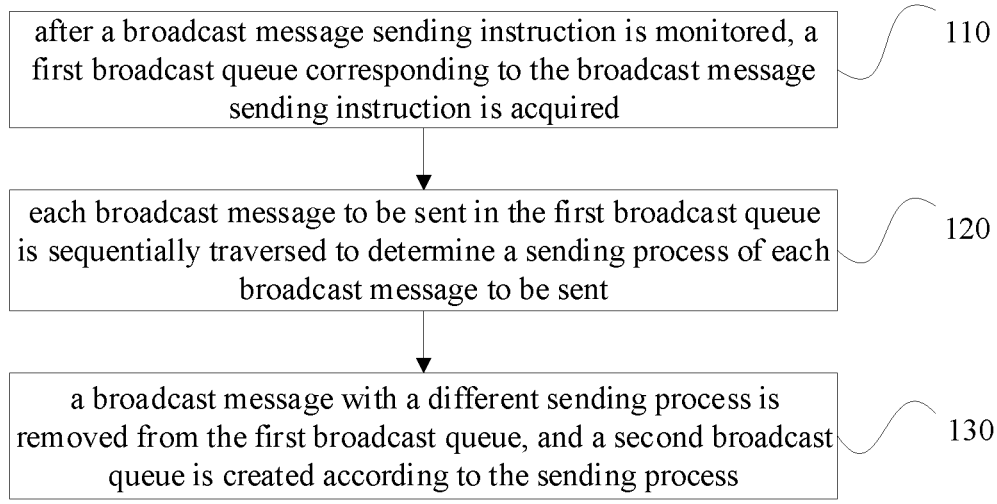
FIG. 1 is a flowchart of a broadcast queue adjustment method provided by an embodiment of the present application.

The present disclosure will be described below with reference to the drawings and examples. For convenience of description, only parts related to the present disclosure are shown in the drawings instead of all structures.

FIG. 1 is a flowchart of a broadcast queue adjustment method provided by an embodiment of the present application. The embodiment can be applied to a broadcast sending process to adjust broadcast queues. The method can be executed by a terminal provided by the embodiment. A broadcast queue adjusting device of the terminal can be implemented by at least one of software and hardware. As shown in FIG. 1, the broadcast queue adjustment method provided by the embodiment includes the following blocks.

In block 110, after a broadcast message sending instruction is monitored, a first broadcast queue corresponding to the broadcast message sending instruction is acquired.

In the broadcast processing process, a service process of a broadcast sender sends a broadcast message to a management module (such as an Activity Manager Service) by calling a sendBroadcast function. Upon receiving the broadcast message, the management module puts the broadcast message into a first broadcast queue, and the management module sends the broadcast messages in the first broadcast queue to broadcast receivers meeting receiving conditions through a process communication mechanism (such as a Binder process communication mechanism).

In a broadcast mechanism, the broadcast messages refer to information sent by system or an application during running process for transmitting between systems, between applications, or between a system and an application. In one example, the broadcast message may be a system startup broadcast message, a short message broadcast message, a telephone call broadcast message or a three-party application broadcast message, etc.

In one embodiment, taking a counter application as an example of a broadcast sender, the way in which the counter application sends a broadcast message to the management module can be expressed as follows.

//Creating a broadcast message
Intent intent=new Intent (BROADCAST_COUNTER_ACTION);
//Delivering counter parameters and corresponding count values
intent.putExtra(COUNTER_VALUE, counter);
//Sending the broadcast message
sendBroadcast(intent)

In one embodiment, the management module creates a first broadcast queue after receiving a broadcast message sent by the broadcast sender, and sequentially sends the broadcast messages in the first broadcast queue. The process of the broadcast sender sending the broadcast message and the process of the broadcast receiver receiving the broadcast message are asynchronous operating processes, and the broadcast sender and the broadcast receiver are matched in a low coupling relationship through the management module. Broadcast messages can be classified into ordinary broadcast messages and ordered broadcast messages according to different broadcast sending modes. After the ordinary broadcast messages are sent out by the management module, the broadcast receivers receive the broadcast messages without order. After the ordered broadcast messages are sent out by the management module, the broadcast receivers receive broadcast messages sequentially in the order of the broadcast messages, i.e., after a first broadcast receiver receives and processes the broadcast message, a second broadcast receiver can start to receive and process the broadcast message, and so on. The broadcast queue adjustment method disclosed in this embodiment can be limited to the ordered broadcast mode.

In one embodiment, after a broadcast message sending instruction is monitored, a first broadcast queue corresponding to the broadcast message sending instruction is acquired. The broadcast message is a broadcast message in a broadcast queue maintained in the management module, and when the broadcast message is sent, the first broadcast queue in which the broadcast message is located is acquired. In one example, the first broadcast queue can be looked up according to the name of the broadcast message (e.g., BROADCAST_COUNTER_ACTION), and the queue containing the name of the broadcast message is determined to be the corresponding first broadcast queue.

In block 120, each broadcast message to be sent in the first broadcast queue is sequentially traversed to determine a sending process of each broadcast message to be sent.

In one embodiment, the broadcast messages currently to be sent in the first broadcast queue are traversed and sending processes corresponding to the broadcast messages are determined. Processes refer to running activities of programs in a system on the data set, are the basic units for the system to allocate and schedule resources, are the basic components making up the system structure, and are the basic execution entities of applications. In one example, the sending process may be a process when a broadcast sender sends a broadcast message, or a process occupied by a management module when a broadcast message is sent to a broadcast receiver and is processed by the broadcast receiver.

In one embodiment, the process of determining the sending process of each broadcast message to be sent may be to determine the corresponding process Identification (ID) number for executing the broadcast message according to the name of the broadcast message (such as BROADCAST_COUNTER_ACTION).

In block 130, a broadcast message with a different sending process is removed from the first broadcast queue, and a second broadcast queue is created according to the sending process.

In one embodiment, creating the second broadcast queue according to the sending process includes grouping the broadcast messages with consistent sending processes into the second broadcast queue. In one example, broadcast messages with different process IDs corresponding to the broadcast message sending processes can be removed from the first broadcast queue according to the process ID number, and then the second broadcast queue can be created according to the process IDs, and the sending processes of the broadcast messages in each newly created second broadcast queue remain consistent.

In one embodiment, after the broadcast messages with consistent sending processes are grouped into the second broadcast queue, the broadcast queue adjustment method further includes: simultaneously starting to send the broadcast messages in the first broadcast queue and the broadcast messages in the second broadcast queue corresponding to the broadcast message sending instruction. In this embodiment, the sending processes of the broadcast messages in the original broadcast queue and the newly-created broadcast queue are different, and parallel sending of the broadcast messages in the ordered broadcast queues is realized by simultaneously sending the a broadcast message with a different sending process, so that the broadcast receivers can simultaneously process the broadcast messages.

In one embodiment, a registration process for the broadcast receiver to receive the broadcast message can be represented as follows (take receiving a broadcast message sent by a counter as an example).

//Defining a broadcast message of interest (subscribing to a broadcast message)
IntentFilter counterActionFilter=
new IntentFilter(CounterService.BROADCAST_COUNTER_ACTION);
//Registering a broadcast receiver
registerReceiver(counterActionReceiver,counterActionFilter)

When the broadcast message (BROADCAST_COUNTER_ACTION) sent by the broadcast sender is sent out by the management module, the broadcast message will be received and processed by a corresponding broadcast receiver as the broadcast receiver has registered the corresponding broadcast receiver to receive the broadcast message.

The broadcast queue adjustment method provided by the embodiment acquires a first broadcast queue corresponding to a broadcast message sending instruction after the broadcast message sending instruction is monitored, sequentially traverses each broadcast message to be sent in the first broadcast queue, determines the sending process of each broadcast message to be sent, removes a broadcast message with a different sending process from the first broadcast queue, and creates a second broadcast queue according to the sending process, which solves the problem of low broadcast processing efficiency caused by waiting for the sent broadcast message to be processed before sending a next broadcast message in an ordered broadcast queue in the related art and shortens the processing time of the broadcast queue by putting a broadcast message with a different sending process in their respective broadcast queues to be sent in parallel.

Figure 2:
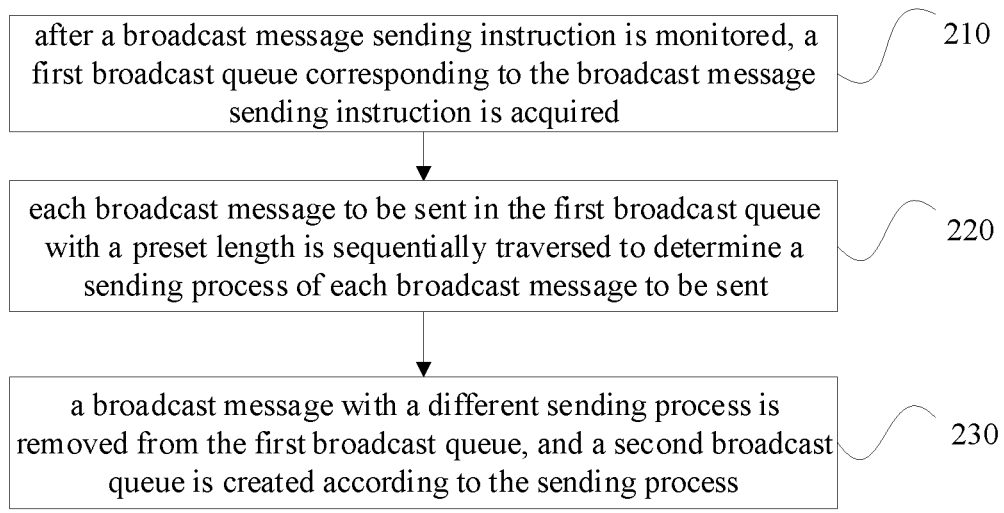
FIG. 2 is a flowchart of another broadcast queue adjustment method provided by an embodiment of the present application.

FIG. 2 is a flow chart of another broadcast queue adjustment method provided by an embodiment of the present application. On the basis of the above embodiment, optionally, sequentially traversing each broadcast message to be sent in the first broadcast queue includes sequentially traversing each broadcast message to be sent in a first broadcast queue with a preset length.

As shown in FIG. 2, the broadcast queue adjustment method provided in this embodiment includes the following blocks.

In block 210, after a broadcast message sending instruction is monitored, a first broadcast queue corresponding to the broadcast message sending instruction is acquired.

In block 220, each broadcast message to be sent in the first broadcast queue with a preset length is sequentially traversed to determine a sending process of each broadcast message to be sent.

In one embodiment, the broadcast queue may contain lots of broadcast messages. In the process of traversing the broadcast messages to confirm the corresponding sending processes, some broadcast messages with top ranking in the broadcast queue may have already been sent and processed. In order to improve the traversing efficiency and the accuracy of determining the sending processes of the broadcast messages, the broadcast messages to be sent in a broadcast queue with a preset length, which may be 100, 200 or 500, etc., are traversed. The preset length can adopt a preset default value, and can be comprehensively determined and dynamically adjusted in real time according to system load (CPU occupancy rate, memory occupancy rate) and current remaining charge. When the system load is high (e.g., CPU occupancy rate is greater than 80%, memory occupancy rate is greater than 80%) and remaining charge is low (less than 20%), the preset length of the broadcast queue to be traversed is reduced (e.g., set to 100), otherwise, the set value of the preset length is increased (e.g., 500).

In block 230, a broadcast message with a different sending process is removed from the first broadcast queue, and a second broadcast queue is created according to the sending process.

In one embodiment, after a broadcast message sending instruction is monitored, a first broadcast queue corresponding to the broadcast message sending instruction is acquired, each broadcast message to be sent in the first broadcast queue with a preset length is sequentially traversed, the sending process of each broadcast message to be sent is determined, a broadcast message with a different sending process is removed from the first broadcast queue, and a second broadcast queue is created according to the sending process, so that the accuracy of determining whether the broadcast message sending processes are consistent is improved, the system resource consumption is reduced, and the broadcast processing mechanism is optimized.

Figure 3:
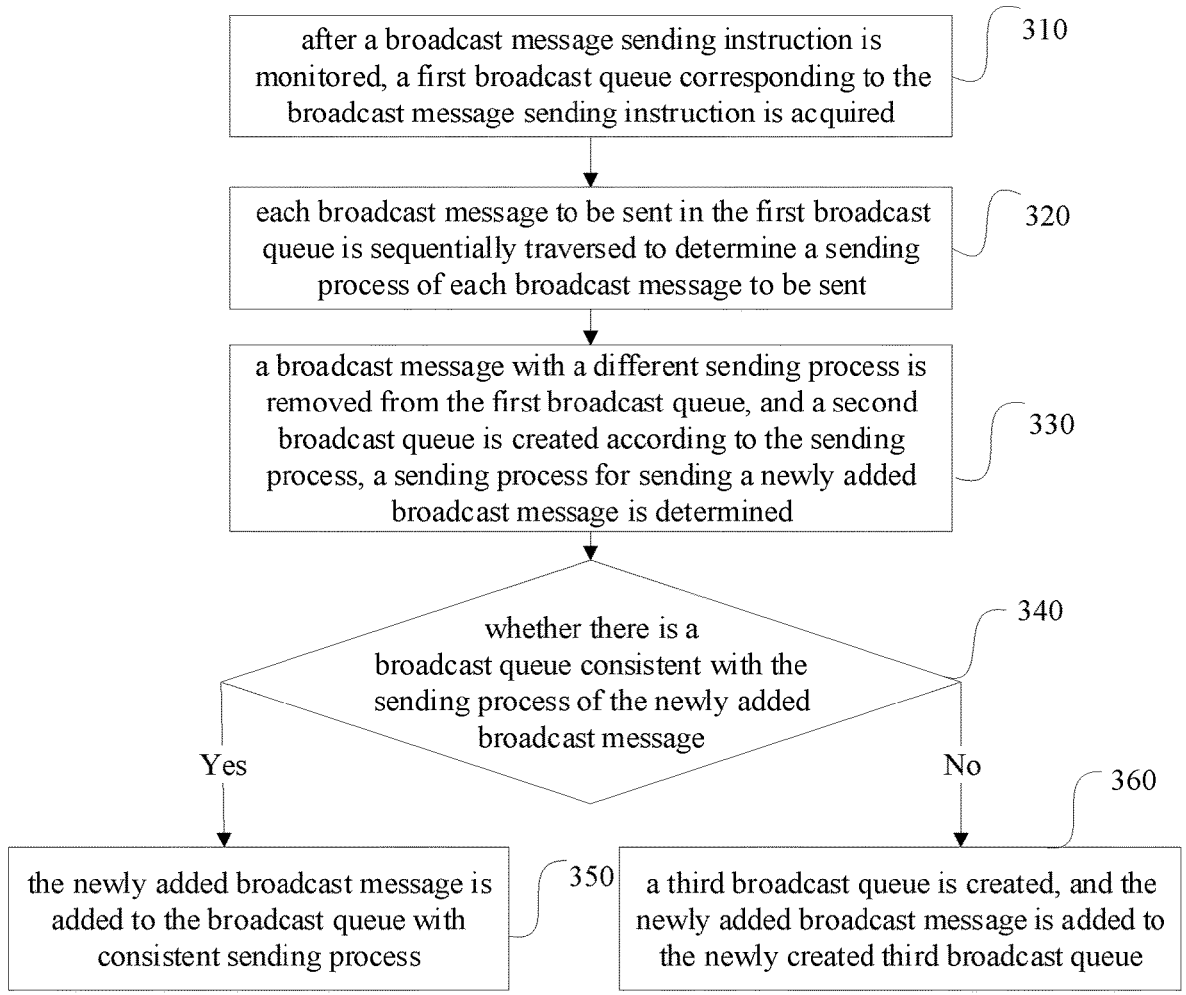
FIG. 3 is a flowchart of another broadcast queue adjustment method provided by an embodiment of the present application.

FIG. 3 is a flow chart of another broadcast queue adjustment method provided by an embodiment of the present application. Based on the above embodiment, optionally, after a second broadcast queue is created according to the sending process, the method further includes: determining a sending process for sending a newly added broadcast message, and adding the newly added broadcast message to a broadcast queue with consistent sending process if there is the broadcast queue consistent with the sending process of the newly added broadcast message; if there is no broadcast queue consistent with the sending process of the newly added broadcast message, a third broadcast queue is created, and the newly added broadcast message is added to the newly created third broadcast queue.

As shown in FIG. 3, the broadcast queue adjustment method provided in this embodiment includes the following blocks.

In block 310, after a broadcast message sending instruction is monitored, a first broadcast queue corresponding to the broadcast message sending instruction is acquired.

In block 320, each broadcast message to be sent in the first broadcast queue is sequentially traversed to determine a sending process of each broadcast message to be sent.

In block 330, a broadcast message with a different sending process is removed from the first broadcast queue, and a second broadcast queue is created according to the sending process, a sending process for sending a newly added broadcast message is determined.

In block 340, it is determined whether there is a broadcast queue consistent with the sending process of the newly added broadcast message. If yes, block 350 is executed, otherwise block 360 is executed.

In one embodiment, when a broadcast sender sends a broadcast message to a management module, a sending process of the newly added broadcast message is determined. If there is an existing broadcast queue having broadcast messages consistent with the sending process of the newly added broadcast message, the newly added broadcast message is added to the corresponding broadcast queue, if there is no broadcast queue having broadcast messages consistent with the sending process of the newly added broadcast message, a third broadcast queue is created, and the newly added broadcast message is added to the newly created third broadcast queue.

In block 350, the newly added broadcast message is added to the broadcast queue with consistent sending process.

In one embodiment, the newly added broadcast message may be added to the end of the broadcast queue with consistent sending process.

In block 360, a third broadcast queue is created, and the newly added broadcast message is added to the newly created third broadcast queue.

In one embodiment, when block 340 determines that there is no broadcast queue consistent with the sending process of the newly added broadcast message, a third broadcast queue is created. Therefore, when sending broadcasting messages, broadcasting messages in different broadcasting queues can be sent simultaneously to realize concurrent processing of the broadcasting messages.

This embodiment provides a broadcast queue adjustment method. When there is a new broadcast message, the sending process of the new broadcast message is determined. If there is a broadcast queue consistent with the sending process of the new broadcast message, the new broadcast message is added to the broadcast queue with consistent sending process. If there is no broadcast queue consistent with the sending process of the new broadcast message, a third broadcast queue is created. The newly added broadcast message is added to the newly created third broadcast queue, so that the adjusting of the broadcast queue is completed when the broadcast messages are queued, and the broadcast messages with consistent sending process are in the same sending queue, so that parallel sending of the broadcast messages can be realized, and the broadcast processing efficiency is increased.

Figure 4:
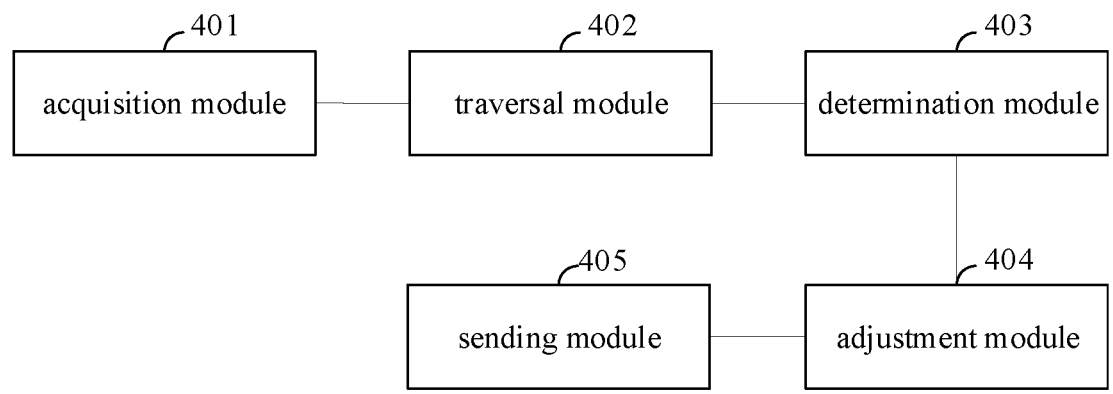
FIG. 4 is a structural block diagram of a broadcast queue adjusting device provided by an embodiment of the present application.

FIG. 4 is a structural block diagram of a broadcast sending device provided by an embodiment of the present application. The device is used for executing the broadcast queue adjustment method provided by the above embodiments, and has corresponding function modules and beneficial effects of the execution methods. As shown in FIG. 4, the device includes an acquisition module 401, a traversal module 402, a determination module 403, and an adjustment module 404.

The acquisition module 401 is configured to acquire a first broadcast queue corresponding to a broadcast message sending instruction after the broadcast message sending instruction is monitored.

The traversal module 402 is configured to sequentially traverse each broadcast message to be sent in the first broadcast queue.

The determination module 403 is configured to determine a sending process of each broadcast message to be sent.

The adjustment module 404 is configured to remove a broadcast message with a different sending process from the broadcast queue and create a second broadcast queue according to the sending process.

The technical solution provided by the embodiment solves the defects of the broadcasting mechanism in related art, increases the broadcast processing efficiency, reduces the system resource consumption, and improves the stability of the system.

Optionally, the adjustment module 404 is configured to group broadcast messages with consistent sending processes into the second broadcast queue.

Optionally, it further includes a sending module 405, which is configured to start to send the broadcast messages in the first broadcast queue and the broadcast messages in the second broadcast queue corresponding to the broadcast message sending instruction simultaneously after the broadcast messages with consistent sending process are grouped into the second broadcast queue.

Optionally, the traversal module 402 is configured to sequentially traverse each broadcast message to be sent in the first broadcast queue with a preset length.

Optionally, the adjustment module 404 is further configured to determine a sending process for sending a newly added broadcast message after the second broadcast queue is created according to the sending process, and add the newly added broadcast message to a broadcast queue consistent with the sending process of the newly added broadcast message if there is the broadcast queue consistent with the sending process of the newly added broadcast message; if there is no broadcast queue consistent with the sending process of the newly added broadcast message, a third broadcast queue is created, and the newly added broadcast message is added to the newly created third broadcast queue.

Figure 5:
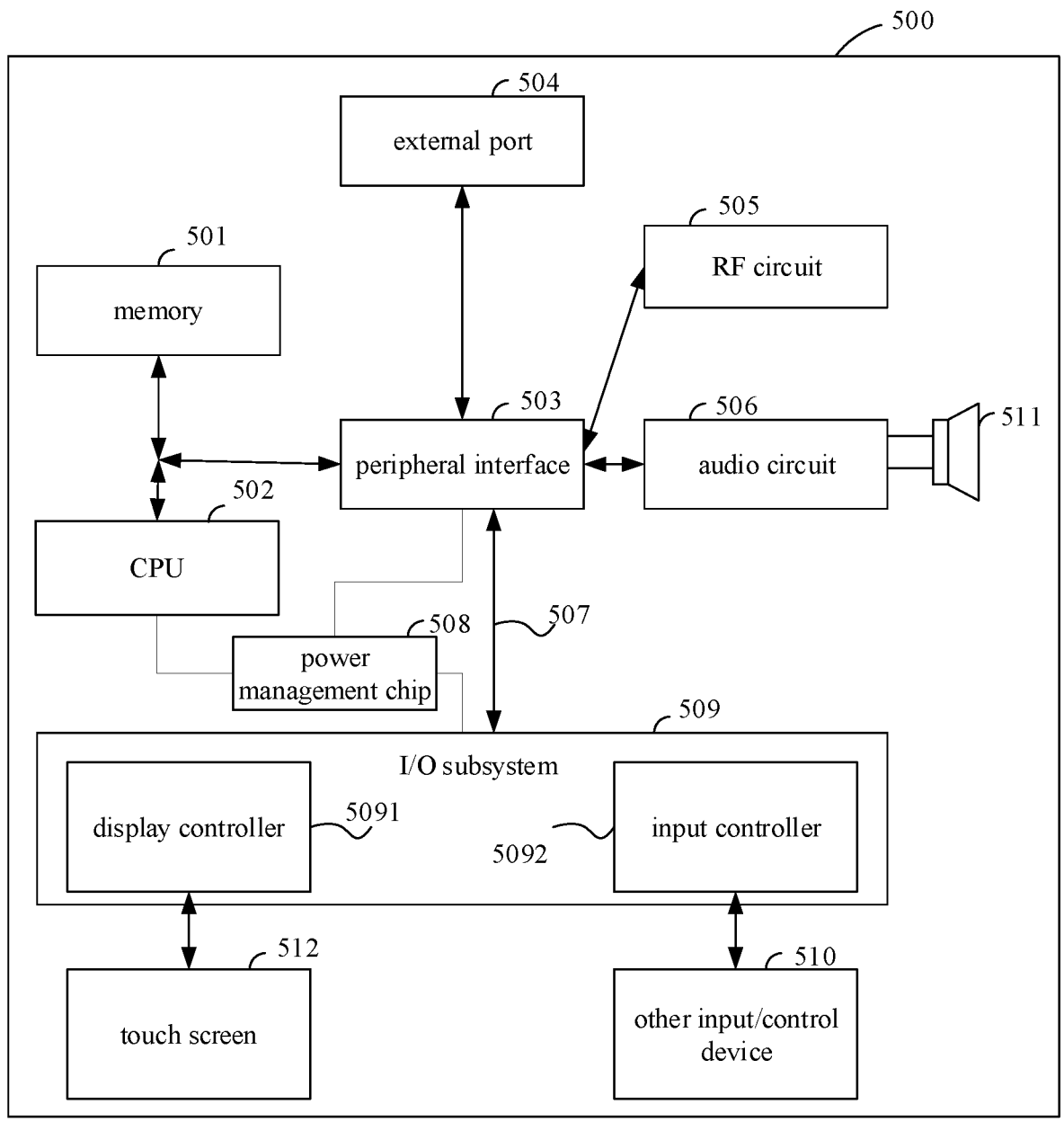
FIG. 5 is a schematic structural view of a terminal provided by an embodiment of the present application.

This embodiment provides a terminal based on the above embodiment, which may include the broadcast queue adjusting device provided in the embodiment. FIG. 5 is a schematic structural view of a terminal provided by an embodiment of the present application. As shown in FIG. 5, the terminal may include a memory 501, a Central Processing Unit (CPU) 502, a peripheral interface 503, an RF (Radio Frequency) circuit 505, an audio circuit 506, a speaker 511, a power management chip 508, an input/output (I/O) subsystem 509, a touch screen 512, other input/control device 510, and an external port 504, which communicate via one or more communication buses or signal lines 507.

The illustrated terminal 500 is only one example of a terminal, and the terminal 500 may have more or fewer components than shown in the figure, may combine two or more components, or may have different component configurations. The various components shown in the figures may be implemented in hardware, software, or a combination of hardware and software including one or more signal processing and/or application specific integrated circuits.

The following is a description of the terminal for the above broadcast queue adjustment method provided in this embodiment, taking a smart phone as an example.

A memory 501, which can be accessed by a CPU 502, a peripheral interface 503, etc., can include a high-speed random-access memory, and can also include a non-volatile memory such as one or more disk storages, flash memory devices, or other volatile solid-state memory devices.

A peripheral interface 503 can connect input and output peripherals of the device to the Central Processing Unit (CPU) 502 and the memory 501.

An Input/output (I/O) subsystem 509 can connect input/output peripherals on the device, such as a touch screen 512 and other input/control device 510, to the peripheral interface 503. The I/O subsystem 509 may include a display controller 5091 and one or more input controllers 5092 for controlling other input/control device 510. Wherein, one or more input controllers 5092 receive electrical signals from other input/control device 510 or send electrical signals to other input/control device 510. Other input/control device may include physical buttons (push buttons, rocker buttons, etc.), dials, slide switches, joysticks, click rollers, etc. It should be noted that the input controller 5092 may be connected with any of a keyboard, an infrared port, a USB interface, and a pointing device such as a mouse.

The touch screen 512 is an input interface and an output interface between a user terminal and a user, and displays visual output to the user. Visual output may include graphics, text, icons, videos, etc.

The display controller 5091 in the I/O subsystem 509 receives electrical signals from the touch screen 512 or sends electrical signals to the touch screen 512. The touch screen 512 detects contact on the touch screen, and the display controller 5091 converts the detected contact into interaction with a user interface object displayed on the touch screen 512, i.e., realizes human-computer interaction. The user interface object displayed on the touch screen 512 may be an icon for running a game, an icon connected to a corresponding network, etc. The device may further include a light mouse, which is a touch sensitive surface that does not display visible output, or an extension of a touch sensitive surface formed by a touch screen.

A Radio Frequency (RF) circuit 505 is configured to establish communication between the mobile phone and a wireless network (i.e., a network side) to realize data receiving and sending between the mobile phone and the wireless network, for example, in order to send and receive short messages, e-mails, etc. Optionally, the RF circuit 505 receives and transmits RF signals, also referred to as electromagnetic signals. The RF circuit 505 converts electrical signals into electromagnetic signals or convert electromagnetic signals into electrical signals and communicate with communication networks and other devices through the electromagnetic signals. The RF circuit 505 may include known circuits for performing the above functions, and the RF circuit 505 includes an antenna system, an RF transceiver, one or more amplifiers, a tuner, one or more oscillators, a digital signal processor, a COder-DECoder (CODEC) chipset, a Subscriber Identity Module (SIM), and the like.

An audio circuit 506 is configured to receive audio data from the peripheral interface 503, convert the audio data into an electrical signal, and transmit the electrical signal to a speaker 511.

The speaker 511 is configured to restore voice signals received by the mobile phone from wireless network through the RF circuit 505 into sound and play the sound to the user.

A power management chip 508 is configured to perform power supply and power management for hardware connected to the CPU 502, the I/O subsystem, and peripheral interfaces.

The CPU 502 provided in this embodiment can perform the following operations.

After a broadcast message sending instruction is monitored, a first broadcast queue corresponding to the broadcast message sending instruction is acquired.

Each broadcast message to be sent in the first broadcast queue is sequentially traversed to determine a sending process of each broadcast message to be sent.

A broadcast message with a different sending process is removed from the first broadcast queue, and a second broadcast queue is created according to the sending process.

Optionally, creating the second broadcast queue according to the sending process includes grouping the broadcast messages with consistent sending processes into the second broadcast queue.

Optionally, after the broadcast messages with consistent sending processes are grouped into the second broadcast queue, the method further includes: simultaneously starting to send the broadcast messages in the first broadcast queue and the broadcast messages in the second broadcast queue corresponding to the broadcast message sending instruction.

Optionally, sequentially traversing each broadcast message to be sent in the first broadcast queue includes sequentially traversing each broadcast message to be sent in the first broadcast queue with a preset length.

Optionally, after the second broadcast queue is created according to the sending process, it further includes: determining a sending process for sending a newly added broadcast message, and adding the newly added broadcast message to a broadcast queue consistent with the sending process of the newly added broadcast message if there is the broadcast queue consistent with the sending process of the newly added broadcast message; if there is no broadcast queue consistent with the sending process of the newly added broadcast message, a third broadcast queue is created, and the newly added broadcast message is added to the newly created third broadcast queue.

The broadcast queue adjustment method, the device and the terminal provided by the disclosure solve the defects of the broadcast mechanism in related art, increase the broadcast processing efficiency, reduce the system resource consumption, and improve the stability of the system.

What is claimed is:

1. A method for broadcast queue adjustment, comprising:
   acquiring a first broadcast queue corresponding to a broadcast message sending instruction after the broadcast message sending instruction is monitored;
   sequentially traversing each broadcast message to be sent in the first broadcast queue to determine a sending process of each broadcast message to be sent;
   removing a broadcast message with a different sending process from the first broadcast queue, and creating a second broadcast queue according to the different sending process;
   determining a sending process for sending a newly added broadcast message, and if there is a broadcast queue consistent with the sending process of the newly added broadcast message, adding the newly added broadcast message to the broadcast queue with consistent sending process; and
   based on a determination that there is no broadcast queue consistent with the sending process of the newly added broadcast message, creating a third broadcast queue, and adding the newly added broadcast message to the newly created third broadcast queue.

2. The method according to claim 1, wherein creating the second broadcast queue according to the different sending process comprises:
   grouping broadcast messages with consistent sending processes into the second broadcast queue.

3. The method according to claim 2, wherein the method further comprises:
   after grouping broadcast messages with consistent sending processes into the second broadcast queue, starting to send the broadcast messages in the first broadcast queue and the broadcast messages in the second broadcast queue corresponding to the broadcast message sending instruction simultaneously.

4. The method according to claim 2, wherein grouping the broadcast messages with consistent sending processes into the second broadcast queue comprises:
   removing a broadcast message with a different process identification number from the first broadcast queue, and creating the second broadcast queue according to the different process identification number; wherein sending processes of the broadcast messages in the second broadcast queue remain consistent.

5. The method according to claim 1, wherein sequentially traversing the each broadcast message to be sent in the first broadcast queue comprises:
   sequentially traversing the each broadcast message to be sent in the first broadcast queue with a preset length.

6. The method according to claim 1, wherein determining the sending process of each broadcast message to be sent comprises:
   determining a corresponding process identification number for executing the broadcast message according to a name of the broadcast message.

7. A terminal comprising: a processor, a non-transitory memory, and a computer program stored in the non-transitory memory and executable on the processor, wherein when executing the computer program, the processor performs the following operations:
   acquiring a first broadcast queue corresponding to a broadcast message sending instruction after the broadcast message sending instruction is monitored;
   sequentially traversing each broadcast message to be sent in the first broadcast queue to determine a sending process of each broadcast message to be sent;
   removing a broadcast message with a different sending process from the first broadcast queue, and creating a second broadcast queue according to the different sending process;
   determining a sending process for sending a newly added broadcast message, and if there is a broadcast queue consistent with the sending process of the newly added broadcast message, adding the newly added broadcast message to the broadcast queue with consistent sending process; and
   based on a determination that there is no broadcast queue consistent with the sending process of the newly added broadcast message, creating a third broadcast queue, and adding the newly added broadcast message to the newly created third broadcast queue.

8. The terminal according to claim 7, wherein the operation of creating the second broadcast queue according to the different sending process comprises:
   grouping broadcast messages with consistent sending processes into the second broadcast queue.

9. The terminal according to claim 8, wherein when executing the computer program, the processor performs:
   after grouping broadcast messages with consistent sending processes into the second broadcast queue, starting to send the broadcast messages in the first broadcast queue and the broadcast messages in the second broadcast queue corresponding to the broadcast message sending instruction simultaneously.

10. The terminal according to claim 8, wherein grouping the broadcast messages with consistent sending processes into the second broadcast queue comprises:

removing a broadcast message with a different process identification number from the first broadcast queue, and creating the second broadcast queue according to the different process identification number; wherein sending processes of the broadcast messages in the second broadcast queue remain consistent.

11. The terminal according to claim 7, wherein the operation of sequentially traversing the each broadcast message to be sent in the first broadcast queue comprises:

sequentially traversing the each broadcast message to be sent in the first broadcast queue with a preset length.

12. The terminal according to claim 7, wherein determining the sending process of each broadcast message to be sent comprises:

determining a corresponding process identification number for executing the broadcast message according to a name of the broadcast message.

13. A non-transitory computer readable storage medium storing computer executable instructions for performing the following operations:

acquiring a first broadcast queue corresponding to a broadcast message sending instruction after the broadcast message sending instruction is monitored;

sequentially traversing each broadcast message to be sent in the first broadcast queue to determine a sending process of each broadcast message to be sent;

removing a broadcast message with a different sending process from the first broadcast queue, and creating a second broadcast queue according to the different sending process;

determining a sending process for sending a newly added broadcast message, and if there is a broadcast queue consistent with the sending process of the newly added broadcast message, adding the newly added broadcast message to the broadcast queue with consistent sending process; and based on a determination that there is no broadcast queue consistent with the sending process of the newly added broadcast message, creating a third broadcast queue, and adding the newly added broadcast message to the newly created third broadcast queue.

14. The non-transitory computer readable storage medium according to claim 13, wherein the operation of creating the second broadcast queue according to the different sending process comprises:

grouping broadcast messages with consistent sending processes into the second broadcast queue.

15. The non-transitory computer readable storage medium according to claim 14, wherein the computer executable instructions further comprise:

after grouping broadcast messages with consistent sending processes into the second broadcast queue, starting to send the broadcast messages in the first broadcast queue and the broadcast messages in the second broadcast queue corresponding to the broadcast message sending instruction simultaneously.

16. The non-transitory computer readable storage medium according to claim 13, wherein the operation of sequentially traversing the each broadcast message to be sent in the first broadcast queue comprises:

sequentially traversing the each broadcast message to be sent in the first broadcast queue with a preset length.

17. The non-transitory computer readable storage medium according to claim 13, wherein determining the sending process of each broadcast message to be sent comprises:

determining a corresponding process identification number for executing the broadcast message according to a name of the broadcast message.

\* \* \* \* \*